United States Patent [19]
Saito

[11] Patent Number: 5,074,256
[45] Date of Patent: Dec. 24, 1991

[54] LUBRICATING SYSTEM FOR A VALVE SEAT OF AN INTERNAL COMBUSTION ENGINE

[75] Inventor: Masafumi Saito, Oyama, Japan

[73] Assignee: Kabushiki Kaisha Komatsu Seisakusho, Tokyo, Japan

[21] Appl. No.: 469,472
[22] PCT Filed: Jul. 24, 1989
[86] PCT No.: PCT/JP89/00736
§ 371 Date: Mar. 23, 1990
§ 102(e) Date: Mar. 23, 1990
[87] PCT Pub. No.: WO90/01108
PCT Pub. Date: Feb. 8, 1990

[30] Foreign Application Priority Data
Jul. 25, 1988 [JP] Japan .................. 63-97298

[51] Int. Cl.⁵ .................. F01P 3/14
[52] U.S. Cl. .................. 123/41.77; 184/6.9
[58] Field of Search .......... 123/90.37, 41.76, 41.77, 123/196 R; 184/6.9

[56] References Cited
U.S. PATENT DOCUMENTS

| | | | |
|---|---|---|---|
| 3,446,313 | 5/1969 | Scherenberg | 184/6 |
| 4,147,149 | 4/1979 | Andrea | 123/41.77 |
| 4,169,488 | 10/1979 | Goloff | 123/41.41 |
| 4,200,066 | 4/1980 | Berchtold | 123/41.77 |

FOREIGN PATENT DOCUMENTS

| | | |
|---|---|---|
| 3346371 | 7/1985 | Fed. Rep. of Germany . |
| 52-111844 | 8/1977 | Japan . |
| 52-137210 | 10/1977 | Japan . |
| 56-50711 | 5/1981 | Japan . |
| 61-108808 | 7/1986 | Japan . |
| 1330032 | 9/1973 | United Kingdom . |

*Primary Examiner*—Noah P. Kamen
*Attorney, Agent, or Firm*—Skjerven, Morrill, MacPherson, Franklin & Friel

[57] ABSTRACT

A lubricating system for a valve seat of an internal combustion engine produces a lubricant oil film on the valve seat (7) of a seat ring (2) providing the valve seat. At least a part of the seat ring (2) providing the valve seat surface (7) is made of a porous material (6, 9) readily containing lubricant oil. The outer cylindrical surface of the seat ring (2) is formed with an annular groove (4) along its circumferential direction. A cylinder head (1) to which the seat ring (2) is fastened is formed with an oil passage (5) for feeding lubricant oil to the groove (4). Feeding of the lubricant oil through the oil passage (5) to the groove (4) causes the valve seat surface (7) providing the part of the seat ring (6, 9) made of the porous material to contain lubricant oil. The lubricant oil thus contained produces a lubricant oil film on the valve seat surface (7), which prevents wear in the valve head and the valve seat surface.

4 Claims, 2 Drawing Sheets

LUBRICATING SYSTEM FOR A VALVE SEAT OF AN INTERNAL COMBUSTION ENGINE

FIELD OF THE INVENTION

The present invention relates to a lubricating system for a valve seat of an internal combustion engine and in particular to a system for lubricating a valve seat of an intake and exhaust valve of an internal combustion engine with which a valve head is in close contact.

BACKGROUND ART

Generally, an intake and exhaust valve mechanism of an internal combustion engine employs a so-called poppet valve. In order to prevent wear in a valve head which is closely located to the wall of combustion chamber, lubricant oil is fed to the valve seat to prevent wear in the valve seat surface.

In addition, in order to feed lubricant oil to the valve seat, the prior art has fed lubricant oil by gravity to the valve seat through a small clearance between the valve stem and the valve guide retaining the stem.

Recently, the internal combustion engine employed a supercharger for boosting the feed pressure of the air-fuel mixture fed to the engine cylinder. The boosted feed pressure of the air-fuel mixture is applied to the clearance between the valve stem of the valve and the valve guide from downstream to upstream of the clearance. Thus, lubricant oil fails to fall through the clearance from upstream to downstream so that the feed of lubricant oil to the valve seat is blocked from sufficiently lubricating the valve seat surface. The head of the valve, when seated on the valve seat surface, receives the internal pressure in the engine cylinder so as to minutely displaced while being in contact with the valve seat surface. In this state, the insufficient feed of lubricant oil to the valve seat surface causes wear in both the head of the valve and the valve seat surface so as to damage the gastightness of the valve, which reduces output of the internal combustion engine.

In view of the above circumstances, an object of the present invention is to provide a lubricating system for a valve seat of an internal combustion engine which ensures lubricant oil is fed to the valve seat so as to prevent wear in the head of the valve and the valve seat surface.

SUMMARY OF THE INVENTION

In accordance with the lubricating system for the valve seat of the present invention, at least a part of the seat ring providing the valve seat surface is made of a porous material readily containing lubricant oil, the outer cylindrical surface of the seat ring is formed with an annular groove, and the engine cylinder head is formed with an oil passage. The lubricant oil which is fed through the oil passage to the annular groove is contained in the porous material part of the seat ring and then produces an oil film on the valve seat surface of the seat ring so as to prevent wear in the valve seat surface and the valve head.

PREFERRED EMBODIMENTS OF THE INVENTION

One embodiment of a lubricating system for a valve seat of the present invention will be described in detail.

Figure 1:
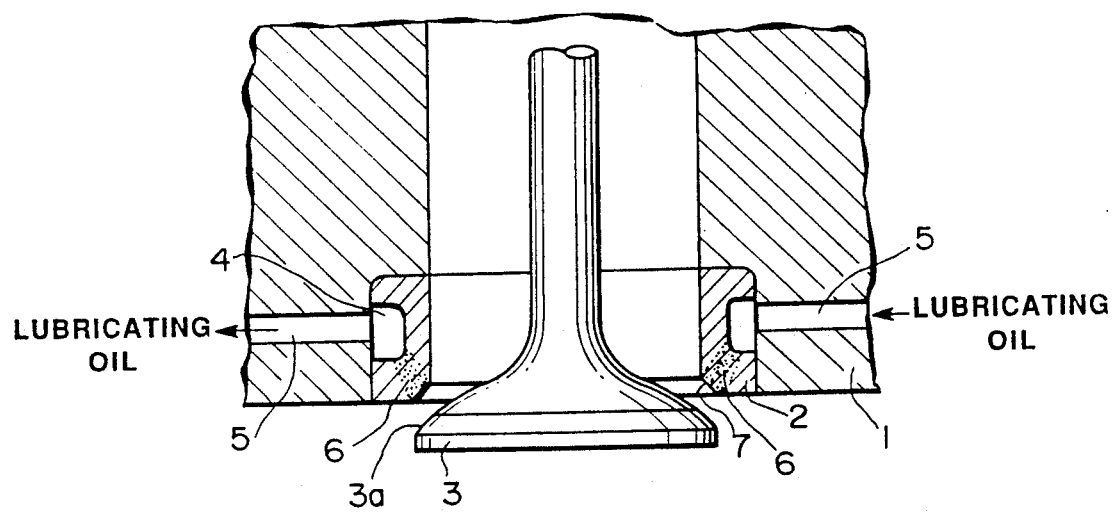
FIG. 1 is a fragmentary section of the main part of an engine cylinder head, illustrating a lubricating system for a valve seat according to one embodiment of the present invention.

FIG. 1 is a fragmentary section of the main part of an engine cylinder head, illustrating the lubricating system for the valve seat according to one embodiment of the present invention.

A cylinder head 1 has a seat ring 2 fitted therewithin and providing the valve seat, i.e., a part of the combustion chamber with which a head 3a of a valve 3 contacts. The outer cylindrical surface of the seat ring 2 is formed with an annular groove 4 along the outer circumference thereof. The annular groove 4 communicates with an oil passage 5 formed in the cylinder head 1.

The seat ring 2 is formed of a single material produced by sintering or a like process which has a mechanical strength sufficient for the valve seat and includes a porous metal structure in part. In particular, an annular part 6 between a valve seat surface 7 of the seat ring 2 and the annular groove 4 is of a porous metal structure.

In accordance with the above lubricating system for the valve seat an oil pump or the like, not shown, forcibly feeds lubricant oil through a right-hand oil passage 5 of FIG. 1 into the annular groove 4 formed in the seat ring 2. Then, lubricant oil circulates through the annular groove 4 to cool the seat ring 2 and returns through a left-hand oil passage 5 of FIG. 1 to an oil pan, etc. A part of the lubricant oil forcibly fed to the annular groove 4 in the seat ring 2 penetrates the part 6 made of the porous metal structure to produce a lubricant oil film on the valve-seat surface 7 of the seat ring 2.

Thus, in accordance wi&h the lubricating system for the valve seat, since the lubricant oil forcibly fed to the annular groove 4 continuously produces a lubricant oil film on the valve seat surface 7 of the seat ring 2, the feed of lubricant oil to the valve seat surface 7 will not become insufficient, which prevents possible wear in both the valve head 3a and valve seat 7 of the suction valve body 3. Thus, the gastightness of the suction valve 3 will not be damaged, and therefore the output of the internal combustion engine will not be reduced.

In accordance with the embodiment described above, since the seat ring 2 is formed of the single material produced by sintering or like process, the seat ring 2 has the mechanical strength sufficient for the valve seat and the porous metal structure in part. However, the present invention is not restricted to the above embodiment. Alternatively, the annular porous metal structure constituting the part 6 may be produced separately from the seat ring 2 and fastened to the valve seat surface 7 of the seat ring 2.

Figure 2:
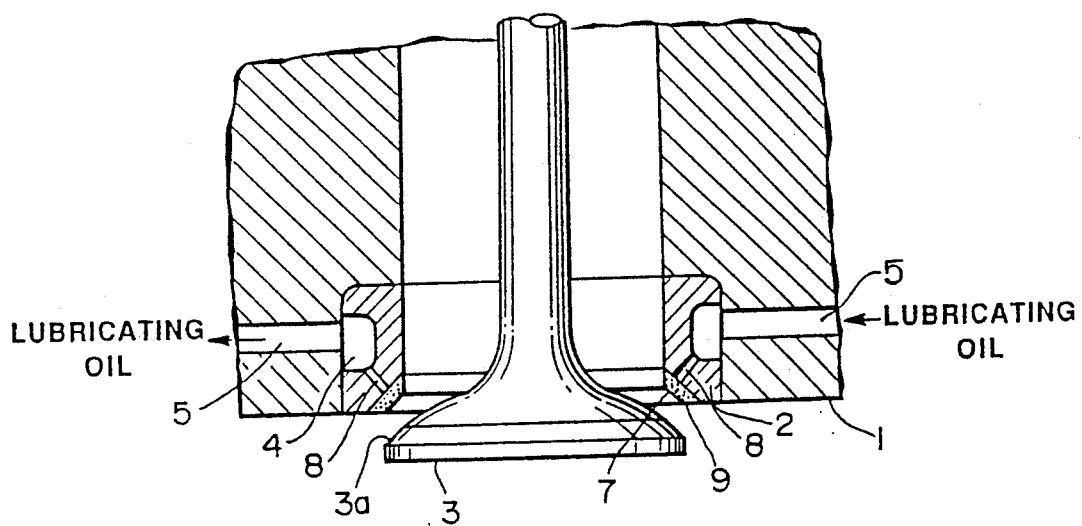
FIG. 2 is a fragmentary section of the main part of engine cylinder head, illustrating a lubricating system for a valve seat according to a second embodiment of the present invention.

FIG. 2 is a fragmentary section of the main part of engine cylinder head, illustrating a second embodiment of the present invention. The same parts as those of FIG. 1 will bear the same numerals.

As shown in FIG. 2, a part providing a valve seat surface 7 of a seat ring 2 has a porous metal structure 9 which communicates through a lubricant oil hole 8 with an annular groove 4.

In accordance with the lubricating system for the valve seat of the second embodiment, the oil pump or the like, not shown, forcibly feeds lubricant oil through a right-hand oil passage 5 of FIG. 2 to the annular groove 4. Then, lubricant oil circulates through the annular groove 4 to cool the seat ring 2 and returns through a left-hand oil passage 5 of FIG. 2 to the oil pan, etc. A part of the lubricant oil forcibly fed to the annular groove 4 in the seat ring 2 penetrates the porous metal structure 9 through the lubricant oil hole 8 and is contained therein to produce the lubricant oil film on the valve seat surface of the seat ring 2.

Thus, also in accordance With the above second embodiment of FIG. 2, since lubricant oil forcibly fed to the annular groove 4 continuously produces the lubricant oil film on the valve seat surface 7, the feed of lubricant oil to the valve seat surface 7 will not become insufficient, which will not cause possible wear in both the valve head 3a and the valve seat surface 7 of the suction valve body 3. Thus, the gastightness of the suction valve 3 will not be damaged, and therefore the output of the internal combustion engine will not be reduced.

As described above, in accordance with the present invention, the outer cylindrical surface of the seat ring providing the valve seat is formed with the annular groove, at least a part constituting the valve seat surface of the seat ring has the porous metal structure, and lubricant oil is fed through the groove to the part having the porous metal structure to produce the lubricant oil film on the valve seat surface, so that when the valve head sits on the valve seat surface and when the valve head in a sitting position receives an internal pressure in the engine cylinder to deform, which causes a minute frictional displacement of the valve head, a possible metal-metal contact between the valve head and the valve seat surface will be eliminated, which prevents possible wear in both the valve head and the valve seat surface. Thus, the gastightness of the valve is retained, which prevents the internal combustion engine from a reduction in output. In addition, feeding lubricant oil to the annular groove formed in the outer cylindrical surface of the seat ring cools the seat ring, so that the mechanical strength of the valve is maintained to highly increase the reliability of the internal combustion engine.

The present invention is not restricted to tho embodiments as illustrated and described but includes various modifications within the scope of the appended claims.

INDUSTRIAL UTILITY

As described above, the lubricating system of the present invention is applicable to a lubricating system for a valve seat of internal combustion engine required to prevent a reduction in the output of the internal combustion engine and improve the reliability of the engine.

What is claimed is:

1. A lubricating system for a valve seat of an internal combustion engine in which lubricant oil is fed to the valve seat made with a seat ring, comprising:

an outer cylindrical surface of the seat ring is formed with an annular groove along a circumferential direction of the outer cylindrical surface and a part of the seat ring providing a valve seat surface of the seat ring is made of a porous material readily containing the lubricant oil only between the valve seat surface and the annular groove; and a cylinder head to which the seat ring is fastened is provided with an oil passage for feeding lubricant oil to the annular groove, whereby the lubricant oil fed through the oil passage and the annular groove is contained in the valve seat surface of the seat ring made of the porous material to produce a lubricant oil film on the valve seat surface.

2. A lubricating system for a valve seat of an internal combustion engine as defined in claim 1, wherein said seat ring is positioned at an intake side valve seat.

3. A lubricating system for a valve seat of an internal combustion engine in which lubricant oil is fed to the valve seat made with a seat ring, comprising:

an outer cylindrical surface of the seat ring is formed with an annular groove along a circumferential direction of the outer cylindrical surface, only a part providing a valve seat surface of the seat ring is made of a porous material readily containing the lubricant oil, and a lubricant oil hole is provided between the valve seat surface and the annular groove; and a cylinder head to which the seat ring is fastened is provided with an oil passage for feeding lubricant oil to the annular groove, whereby the lubricant oil fed through the oil passage, the annular groove and the lubricant oil hole is contained in the valve seat surface to produce a lubricant oil film on the valve seat surface.

4. A lubricating system for a valve seat of an internal combustion engine as defined in claim 3, wherein said seat ring is positioned at an intake side valve seat.

* * * * *